United States Patent [19]

Tedesco

[11] 4,138,534

[45] Feb. 6, 1979

[54] PRODUCTION OF STRUCTURAL MEMBERS FROM RECLAIMED POLYOLEFINS

[75] Inventor: Francis A. Tedesco, Chicago, Ill.

[73] Assignee: Lifetime Foam Products, Inc., Franklin Park, Ill.

[21] Appl. No.: 759,717

[22] Filed: Feb. 7, 1977

[51] Int. Cl.² .............................................. C08V 9/06
[52] U.S. Cl. ..................................... 521/79; 260/2.3; 260/17.4 R; 260/42.45; 260/42.46; 264/45.3; 264/45.5; 264/54; 264/DIG. 69; 521/82; 521/84; 521/91; 521/92; 521/143; 521/144
[58] Field of Search ...................... 260/2.5 HA, 2.5 E; 264/DIG. 64, DIG. 69

[56] References Cited

U.S. PATENT DOCUMENTS

| | | | |
|---|---|---|---|
| 3,251,728 | 5/1966 | Humbert et al. | 260/2.5 HA |
| 3,406,127 | 10/1968 | Alexander | 260/2.5 HA |
| 3,531,553 | 9/1970 | Bodkins | 264/DIG. 14 |
| 3,651,183 | 3/1972 | Hosoda et al. | 260/2.5 HA |
| 3,709,806 | 1/1973 | Minami et al. | 260/2.5 HA |
| 3,819,784 | 6/1974 | Hasama et al. | 264/DIG. 14 |
| 3,856,717 | 12/1974 | Theard et al. | 260/2.5 HA |
| 3,857,914 | 12/1974 | Aishima et al. | 264/DIG. 14 |
| 3,863,000 | 1/1975 | Kasai et al. | 264/DIG. 14 |
| 3,865,915 | 2/1975 | Garner | 264/DIG. 14 |
| 3,901,835 | 8/1975 | Paiella et al. | 260/2.5 HA |
| 3,962,154 | 6/1976 | Elgi | 264/DIG. 14 |
| 4,029,612 | 6/1977 | Collington | 260/2.5 HA |

Primary Examiner—Morton Foelak
Attorney, Agent, or Firm—Gluck Arnstein

[57] ABSTRACT

Extruded structural members are produced from polyolefins reclaimed from lead-acid battery cases which heretofore, because they are not biodegradable, have created an ecological problem. Such structural members have an impact strength which nominally is 17% greater than the impact strength structural members formed of corresponding virgin polyolefins.

7 Claims, 1 Drawing Figure

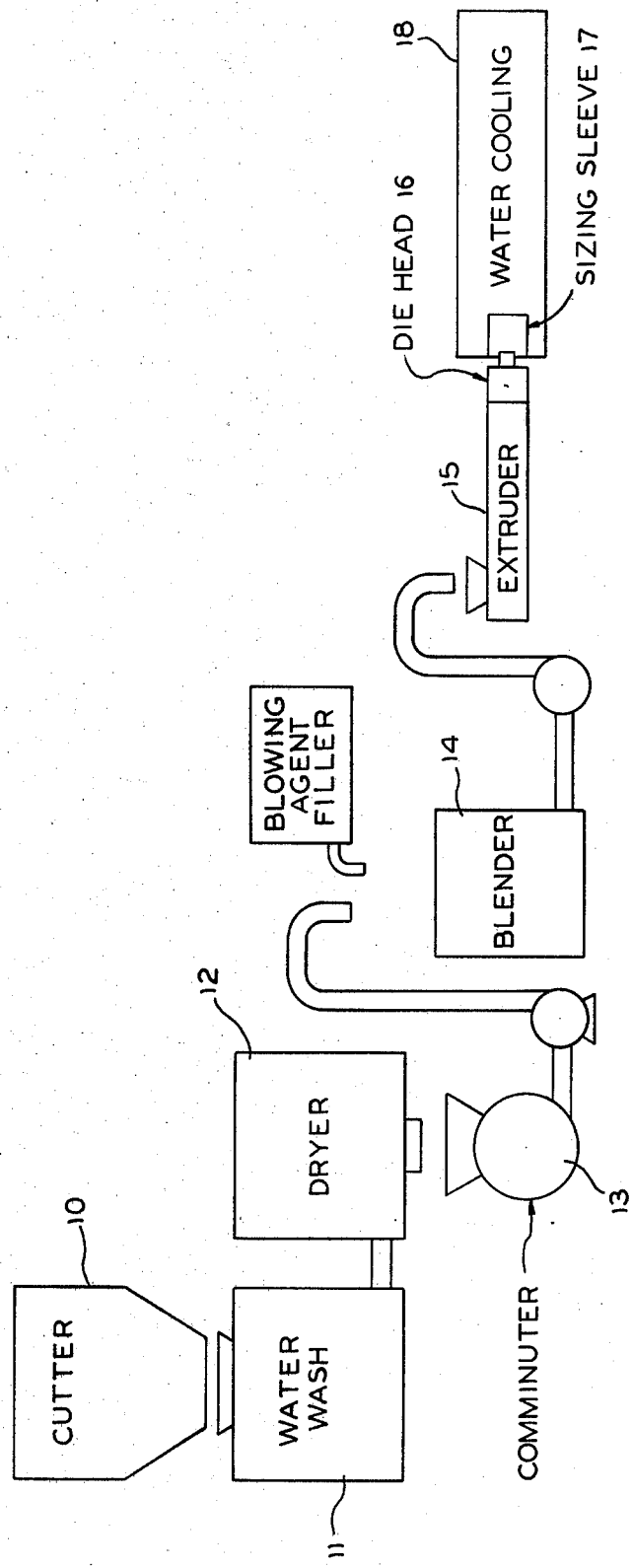

PRODUCTION OF STRUCTURAL MEMBERS FROM RECLAIMED POLYOLEFINS

BACKGROUND OF THE INVENTION

The present invention relates to polyolefins reclaimed from acid battery cases for use in the production of structural members.

I have found that articles fabricated in accordance with the present invention from such reclaimed materials exhibit physical and mechanical properties which suprisingly are superior to similar articles fabricated from virgin polyolefin materials. It is believed that such enhanced properties may result from the absorbtion in a battery case, during its service life, of trace quantities of lead and sulphur which as a result of the processing of the reclaimed battery case, according to the present invention, effect changes in the chemical and physical properties of the polymer resulting in improved impact resistance and increased heat deflection temperature characteristics of the finished manufactured product. Such processing may include molding, extrusion, hot stamping, calendering or milling, all under controlled conditions of heat and pressure. The use of the present invention yields not only improved properties in the manufactured articles but also results in a significant conservation of critical raw materials, as well as of energy and fuel, and the utilization and reclaimation of rapidly accumulating non-biodegradable waste and residue materials in the expanded commerce of the country. The ecological, economic and energy saving benefits derived from the present invention are of highly significant value.

The production of foamed, extruded and added articles from used, reclaimed and residue plastic sources is well known and described in the following U.S. Pat. Nos. 3,857,914; 3,752,631; 3,803,274 and others which describe the equipment, method and generic classes of thermoplastic which may be applied to such art. None of the prior art suggests that any physical or chemical changes or unexpected beneficial results may be derived from the use of materials which have had prior service.

SUMMARY OF THE INVENTION

One of the objects of this invention is the provision of structural members formed from re-cycled, non-biodegradable, thermoplastic waste materials. Such materials do not require energy-intensive processes to produce the thermoplastic from critical petroleum reserves. Further, less energy and fuel are required to produce the reclaimed structural members than would be required to produce the same structural members from virgin first-use thermoplastic materials.

Another object of this invention is the provision of structural members of the foregoing character which have impact resistance superior to similar structural members formed of similar virgin plastic materials.

BRIEF DESCRIPTION OF THE DRAWING

The drawing is a schematic illustration of a preferred embodiment of the process of the invention.

BRIEF DESCRIPTION OF A PREFERRED EMBODIMENT

It is known that there exists large quantities of old and discarded storage battery cases formed of polyolefins, such as polypropylene, polyethylene or combinations or copolymers thereof. Battery cases fabricated from such materials have become increasingly popular because of their desirable qualities. In particular, such cases may be fabricated with thinner walls than cases made from hard rubber thereby providing greater space for the battery components. Unfortunately, the polyolefin cases are not biodegradable and when discarded their accumulation as waste creates an ecological problem.

In accordance with this invention, waste or discarded storage battery cases formed of polyolefins, such as polypropylene, polyethylene or combinations or copolymers thereof, are salvaged by cutting the same into fragments in a suitable mill 10. These fragments then are cleaned by a simple water wash 11 to remove surface residues of acids and salt. If oils and greases are present their removal may require a detergent wash or solvent cleaning, utilizing conventional methods and materials. The washed fragments are dried in dryer 12 of any suitable type and are converted into comminuted particles in a comminuter 13. These particles may be combined with other reclaimed or residue polyolefin materials from other sources, similarly treated, such that the battery acid case particles may constitute from 25–100% of the total polyolefin content of a fabricated article. The polymers recoverd from battery acid service have been shown to contain from 0.001% to 0.003% lead compounds and 0.05% to 0.15% of sulphur compounds which appear to have become absorbed in the battery cases by chemical, physical or mechanical means but which, in the fabrication of the commercial articles, appear to be chemically and physically combined with the polymers.

Organic or inorganic blowing agents which decompose or vaporize by the controlled application of heat together with desired fillers, extenders and other conventional processing agents may be added to the polyolefin particles and mixed in a suitable blender 14.

While the particles may be processed according to a variety of procedures, well known in the art, as hereinabove noted, the invention will be described in relation to the forming of foamed extruded elongated articles such as beams, rods, cylinders and other shapes. Such foamed articles have a skin/core structure in which the skin has an unexpanded non-cellular quality while the core or interior section has a cellular structure.

In accordance with my invention the treated polyolefin particles are fed into a blender 14 where they are admixed with blowing agents and, if desired, other fillers, extenders and processing aids which are well known in the art. The mixture is introduced into an extrusion apparatus 15 which is of generally conventional type. Examples of such type of apparatus are disclosed in U.S. Pat. Nos. 2,747,224 and 3,803,274.

The present invention will be explained in further detail with reference to the following example which is not to be construed as limiting the scope of the invention.

EXAMPLE 100 lbs. of reclaimed polypropylene particles were mixed in a blender with 0.193 lbs. of Azodicarbonamide, a blowing agent and 0.149 lbs of mineral oil having a specific gravity of 0.903 and then supplied to an extrusion apparatus such as Model Thermatic No. III (3¼″) manufactured by Davis/Standard Division, Crampton & Knowles Corp. The barrel of the screw feed device of the extrusion apparatus 15 is is divided into three heat zones, each of which is electronically controlled. The temperature of each of the zones is thermostatically controlled so that there is a progressive increase in temperature as the particles advance in the barrel. Thus, the first zone preferably, has a temperature of 350-390° F, the second zone 360-400° F and the third zone 380-430° F. The granular mixture will be softened and plasticized as it is advanced by the screw feed to the gate at the entrance to the die head 16, the gate being maintained at a temperature of 410-440° F while the die head is maintained at a temperature of 380-400° F.

The fused mixture passes through the die head 16 into a water cooled sizing sleeve 17 and then into a water bath 18 to effect cooling of the profile. The obtained molded article was a rigid structural I beam having a dense outer skin having increased structural integrity and an inner cellular core of lower density providing an economic advantage in material utilization. The beam had a total depth of 2¼", a flange width of 2" with the thickness of each of the flanges and central web being ¼".

Examples of other typical blowing agents for foaming the polyolefins are Azodicarbonamides, Dimethyl Dinitrosoterephthalamide and Azodiisobutyronitrile.

Examples of typical fillers which may be used as extenders of the thermoplastic material are Silica, Carbon Black, Talc, Alumina, Calcium Carbonate, Titanium Dioxide, Clay, Wood Flour and Fiberglass.

Comparative ASTM impact strength tests made by Southwest Research Institute of San Antonio, Tx. on foamed samples of reclaimed polypropylene (battery cases) and foamed virgin polypropylene showed that the impact strength of reclaimed polypropylene nominally is 17% greater than the impact strength of virgin polypropylene.

The structural members produced in accordance with my invention find utility in many applications including, for example, wall studding and framing for upholstered furniture and case goods.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. As a new article of manufacture, a cellular shaped structural member constituting between 25 and 100% of a polyolefin resin reclaimed from discarded lead-acid storage battery casings, said reclaimed polyolefin containing about 0.001 - 0.003% lead compounds and about 0.05 - 0.15% sulfur compounds.

2. The invention as defined in claim 1 in which the structural member has a dense outer skin and a foamed inner core of lower density.

3. The invention as defined in claim 1 in which the structural member includes a filler.

4. A structural member in accordance with claim 1, wherein said polyolefin is selected from the group consisting of polypropylene, polyethylene, copolymers of ethylene and propylene, and blends of polyethylene and polypropylene.

5. A method for producing shaped articles from discarded lead-acid storage battery casings formed of a polyolefin resin containing about 0.001-0.003% lead compounds and about 0.05-0.15% sulfur compounds comprising the steps of cutting the casings into fragments, washing and drying said fragments, comminuting said fragments, admixing said comminuted fragments with a blowing agent, extruding said mixture through a forming die into a desired cross sectional configuration and cooling the extruded article.

6. The method according to claim 6 wherein a filler is admixed with the fragments and the blowing agent.

7. The method according to claim 6 wherein the admixed material is heated as it advances in the direction of the forming die.